UNITED STATES PATENT OFFICE.

FRANK E. COULTER, OF OMAHA, NEBRASKA.

PROCESS OF MAKING DETERGENT COMPOUNDS.

SPECIFICATION forming part of Letters Patent No. 534,816, dated February 26, 1895.

Application filed September 10, 1894. Serial No. 522,678. (No specimens.)

*To all whom it may concern:*

Be it known that I, FRANK E. COULTER, residing at Omaha, in the county of Douglas and State of Nebraska, have invented certain useful Improvements in Processes of Preparing Washing Compounds; and I do hereby declare that the following is a full, clear, and exact description of the invention, such as will enable others skilled in the art to which it appertains to make and use the same.

This invention has relation to a new and novel process of manufacturing a washing compound, the object being to provide a method of preparing a washing compound that shall be an active detergent, while at the same time containing no injurious chemicals adapted to destroy or injure the cloth or fabrics.

The following is the method of procedure: I use of parafin one ounce, of white wax one and one-half drams. These two ingredients are slowly melted in a water bath. I next prepare a mixture of oil of gaultherium drops and olium cassia; taking of the first and of the last named compound ten drops, to which I add fifteen grains of carbolic acid. This mixture is thoroughly stirred and agitated and then combined with fifteen drops of alcohol. The whole mixture is then heated to the boiling point, which gives a clear, straw-colored liquid. To this preparation, while still in a heated condition, is next added the parafin and white wax mixture, the whole compound being then heated to the boiling point, the mixture being thoroughly stirred and agitated in a water bath, after which the compound is poured out into molds of the desired size and placed in a cooling room or chamber. After solidifying, the compound is ready to be wrapped in packages for shipment.

The preparation, as prepared above, possesses the following advantages: It is an antiseptic and contains the essential oils, possesses an agreeable odor, while the parafin mixture acts upon the fabric in such a manner as to remove all dirt or ordinary stains without injury. A small cake of the compound, in using, is placed within the wash boiler or receptacle adapted to receive the clothes, to boiling water of which has been previously added an ordinary bar of soap, of any ordinary reliable brand, to make the suds, and when this washing compound and the soapy water have been thoroughly mixed and dissolved the clothes are added and allowed to boil from ten to fifteen minutes. The clothes or articles are then removed and the washing completed in the usual manner excepting the ordinary rubbing of the clothes, which, by the use of this washing compound, is made unnecessary.

The following modifications of my process might be made without departing from the spirit of my invention: Use nine hundred and sixty parts of parafin, to which are added ninety parts of white wax. These two ingredients are thoroughly stirred and mixed under a boiling heat in a water bath, when a second mixture, comprising five parts of oil of cassia and fifteen parts of carbolic acid and sixty parts of alcohol, is added, at the point of ebullition. These two ingredients are then gently heated up to 185° Fahrenheit, under a continuous agitation for three minutes, when the mixture is poured into a cold mold to form a top film, when they are promptly submerged in an iced water bath. The body of this compound is composed of parafin, the white wax acting as a hardener, as does also the alcohol. The acid, of course, acts in the capacity of an antiseptic, while the oil of cassia is used for the purpose of giving a pleasant odor to the mixture; or the procedure might be as follows: To nine hundred and sixty parts of parafin are added ninety parts of white wax. These two ingredients are melted in a water bath and brought to a temperature of not less than 185° Fahrenheit. I next add eighty parts of alcohol to which I add twenty parts of carbolic acid. These two liquids are united in a glass retort in order to be brought to a point of ebullition. While heated, this second compound is added to the first while at its highest temperature, when the two compounds are thoroughly mixed and agitated for two or three minutes while remaining at their highest temperature. This combined preparation is then placed within a tray or pan, which pan, after the compound has begun to harden, is submerged in a water bath brought as near to the temperature of melting ice as possible. The compound is held within this iced bath for two or three hours when it is ready to be wrapped and packed, ready for shipment. The compound so prepared possesses highly antiseptic properties, is pleasing as to odor and possesses efficient cleansing qualities.

In carrying out my improved process all of the liquids are united in a glass retort in order to be brought to the point of ebullition. The solid portion is melted in a water bath and brought to a temperature of not less than 185° Fahrenheit. When this degree is reached, the liquid portion, being brought to the point of ebullition, is added. The entire compound is then thoroughly agitated for two or three minutes while remaining at its highest temperature. After having been agitated the compound is ready to be poured into a cooling pan. These pans to receive the mixture should be of such a character that when filled they will float on water. The water should be as nearly the temperature of melting ice as possible. With the pans in position on the surface of the iced water they receive the boiling mixture from the water bath. After an interval of sufficient length, there is formed a film over the surface of the compound which, when it has become sufficiently hard to withstand the water, the entire pan and contents is to be completely submerged in the iced water bath. The pan and compound is then allowed to remain in this condition until thoroughly hardened, which generally takes from one to four hours, the length of time depending upon the temperature of the water. The contents of the pan should then be of a pearly white color and quite solid, when it is ready to be removed for use. The advantages of this process are that it gives a superior product to any other, and that it attains a greater degree of hardness and withstands the summer temperature better, which is important from a commercial point of view.

Now, having thus described my said invention, what I claim as new, and desire to secure by United States Letters Patent, is—

The process of preparing a detergent composition which consists in, first, melting a mixture of parafin wax; second, adding thereto, while in a heated condition, accompanied by agitation, a mixture of oil of cassia, oil of gaultherium, carbolic acid and alcohol, and finally pouring the compound thus obtained into molds immersed in iced baths, all substantially as and for the purpose set forth.

In testimony whereof I affix my signature in presence of two witnesses.

FRANK E. COULTER

Witnesses:
H. W. PENNOCK,
G. W. SUES.